Patented Sept. 14, 1954

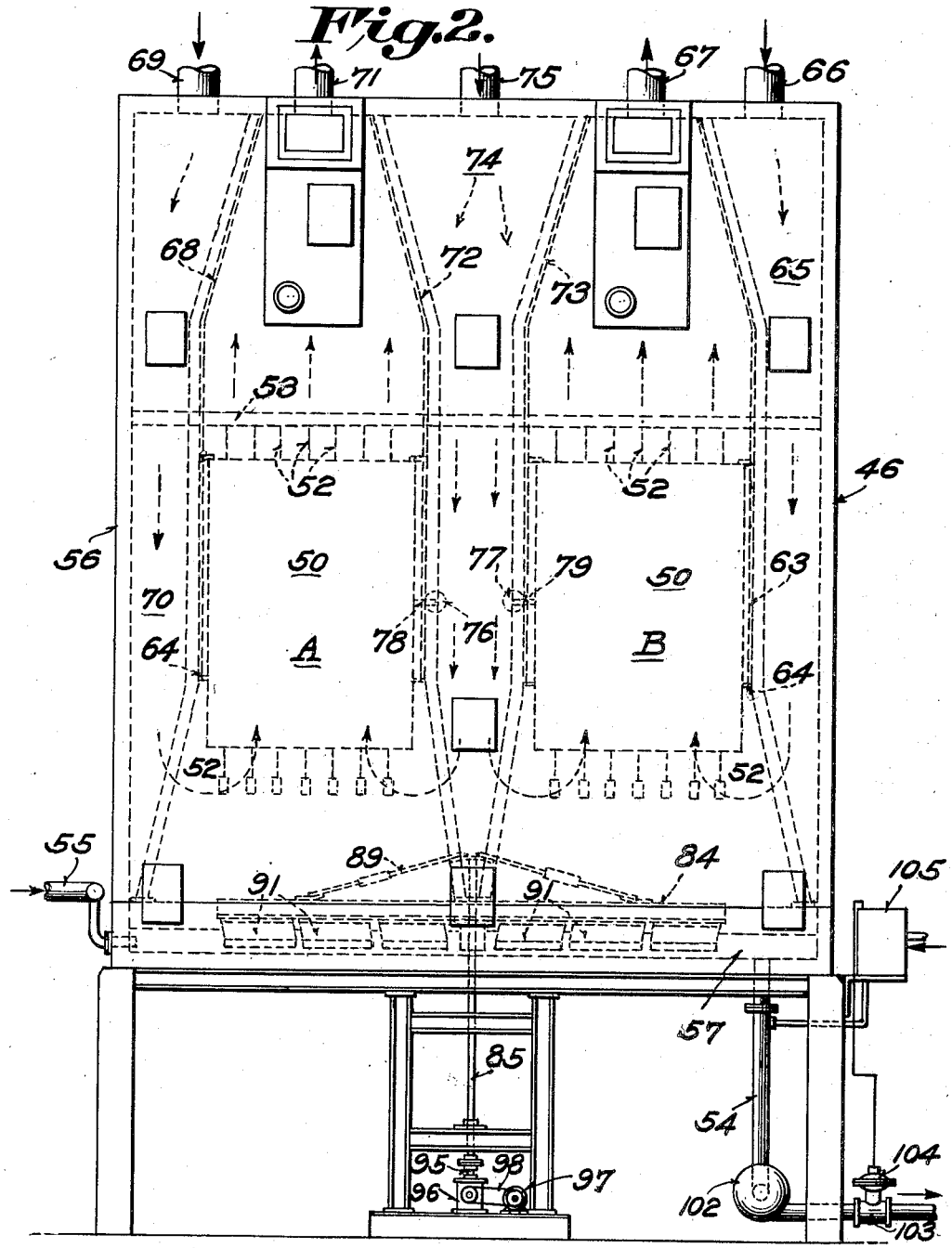

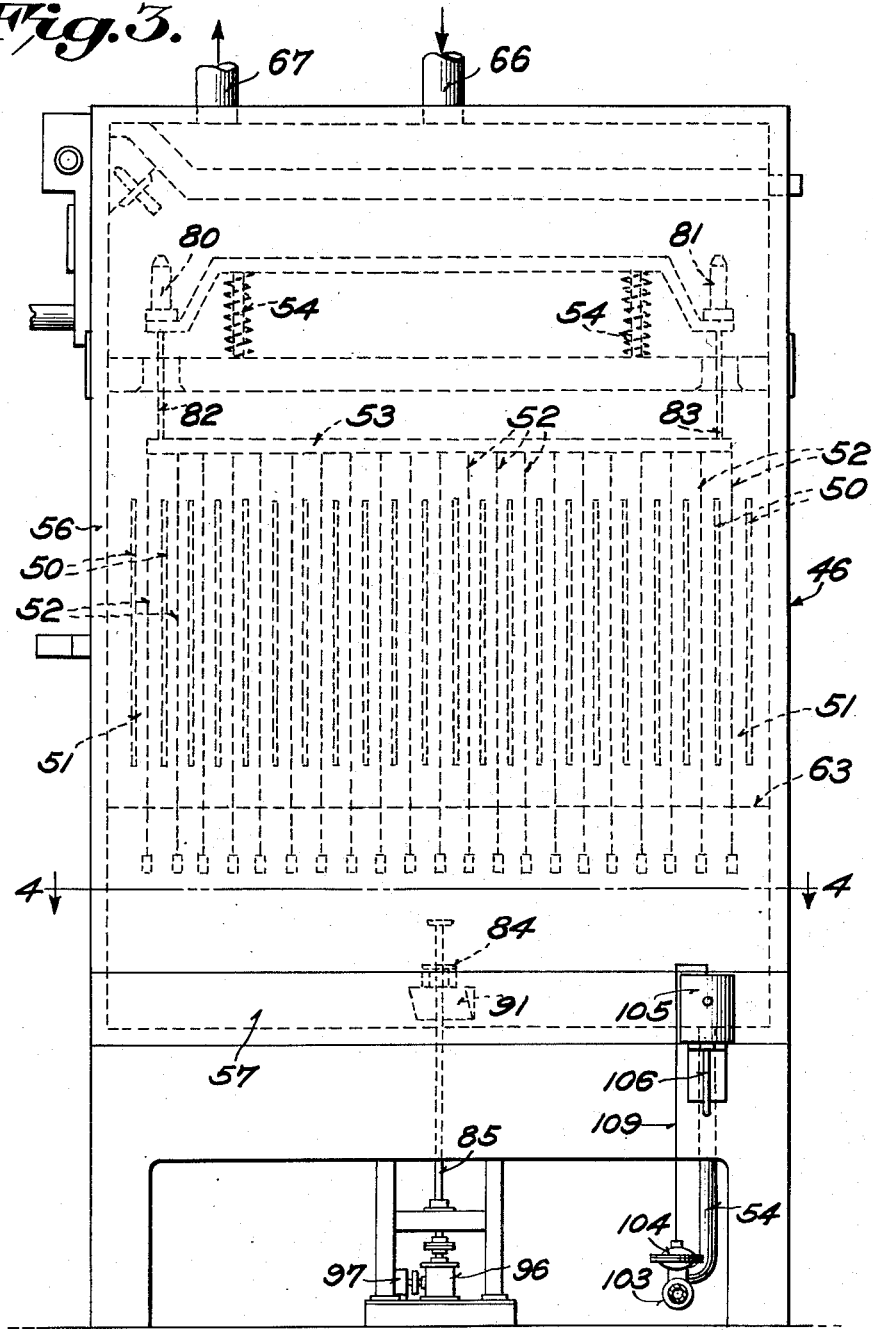

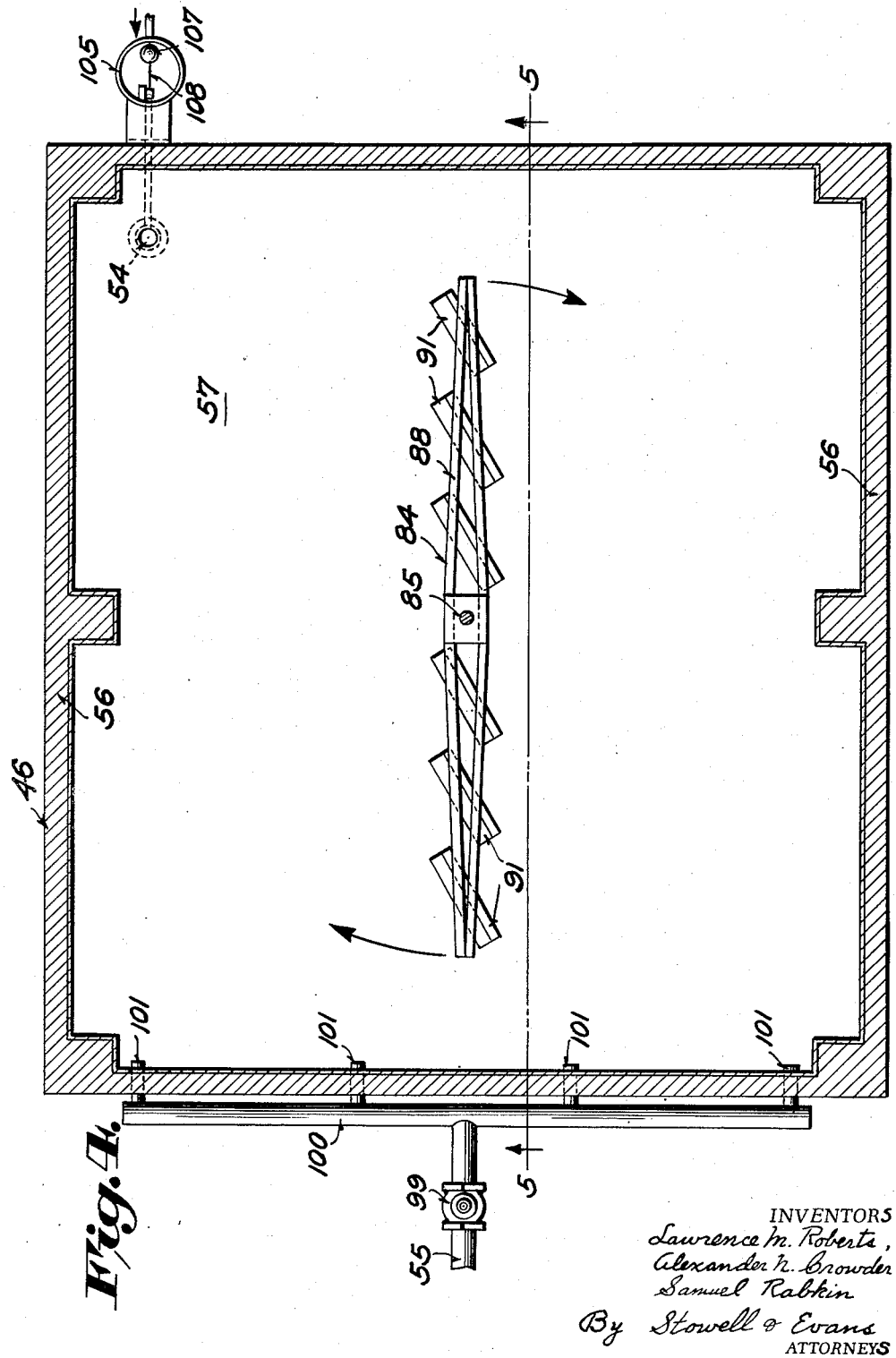

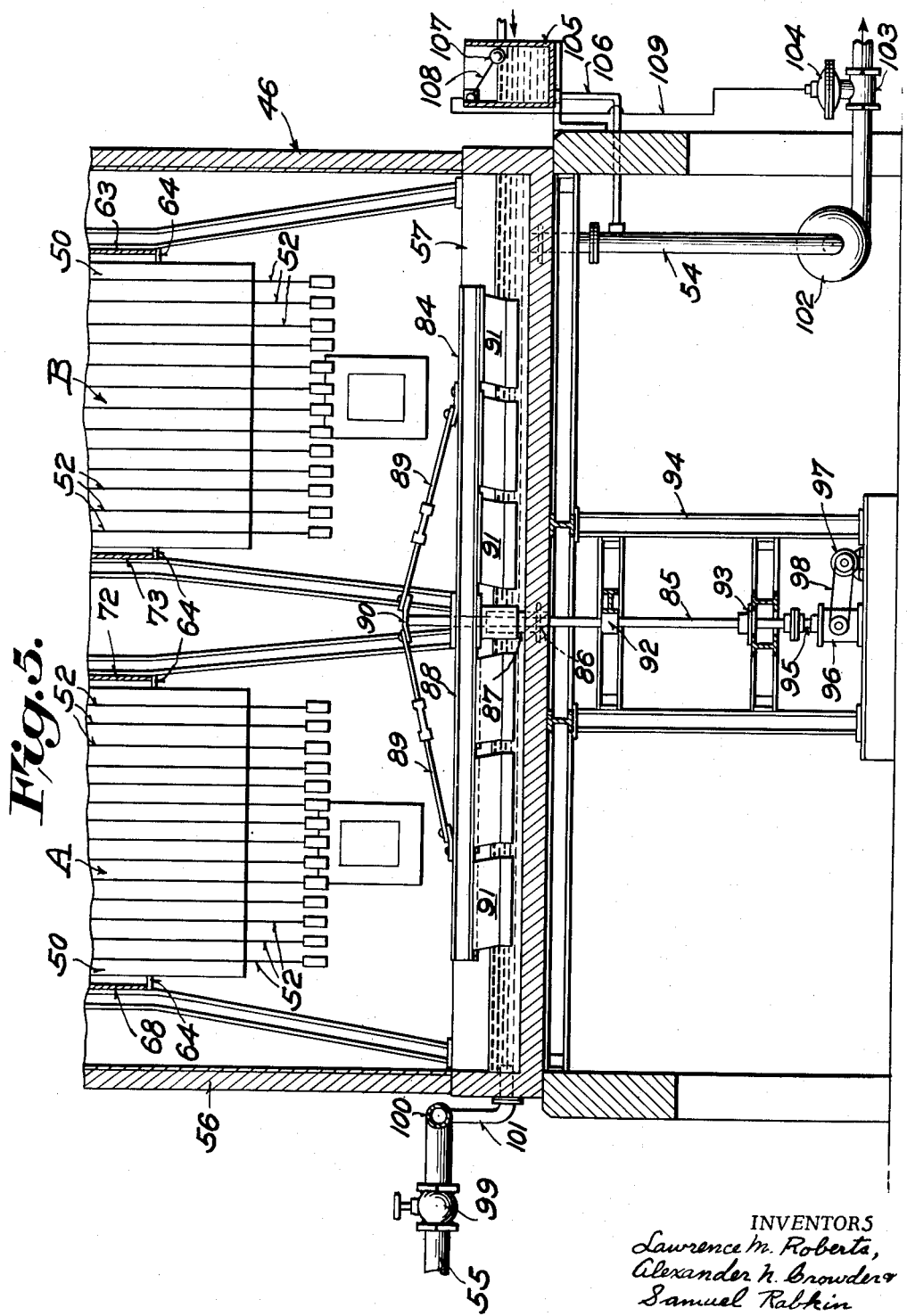

2,689,019

UNITED STATES PATENT OFFICE 2,689,019

RECOVERY OF CHEMICALS FROM GASES AND APPARATUS

Lawrence M. Roberts and Alexander N. Crowder, Bound Brook, and Samuel Rabkin, Elizabeth, N. J., assignors to Research Corporation, New York, N. Y., a corporation of New York Application October 27, 1949, Serial No. 123,866

5 Claims. (Cl. 183—7)

This invention relates to a process and apparatus for producing paper pulp such as kraft paper pulp by the so called "sulphate" process.

More particularly, this invention relates to effecting improvements in the recovery of black liquor from the digestors.

An object of the invention is to provide apparatus and a process for preparing paper pulp that is highly efficient in operation and that conserves expensive chemicals utilized in the process.

Another object is to provide improved electrical precipitation apparatus for collecting and recovering sulphate ash from the flue gases in the dry condition and dissolving the precipitated ash in black liquor to fortify the latter.

These and other objects of the invention as may appear hereinafter are realized in a sulphate process of making paper pulp including digesting cellulosic material, separating weak black liquor from the stock resulting from the digestion step, concentrating the weak black liquor, preferably by multiple-effect evaporation, and burning the concentrated black liquor to produce ash, electrically precipitating ash from the gases resulting from the burning operation in a precipitation zone, maintaining an agitated pool of weak black liquor in a zone contiguous with the precipitation zone, transferring precipitated ash from the precipitation zone to the zone contiguous thereto and dissolving the ash in the weak black liquor to fortify the same, withdrawing fortified black liquor from the pool, and replenishing the pool by introducing weak black liquor thereto. Preferably, the weak black liquor that is used for forming and replenishing the pool is diverted from the supply of weak black liquor flowing to the multiple-effect evaporators and the fortified black liquor formed in the pool is commingled with heavy black liquor flowing from the evaporators to the recovery furnace.

The invention will be described with greater particularity, and other of its aims, objects and advantages will be in part pointed out and in part apparent in the following detailed description taken with accompanying drawings, wherein:

Fig. 2 is an elevational view of an electrical precipitator employed in the mill of Fig. 1;

Fig. 3 is a right side view of the precipitator of Fig. 2;

Fig. 4 is a somewhat enlarged sectional view taken along the plane of the line 4—4 of Fig. 3; and Fig. 5 is a sectional view taken along the plane of the line 5—5 of Fig. 4.

Figure 1:
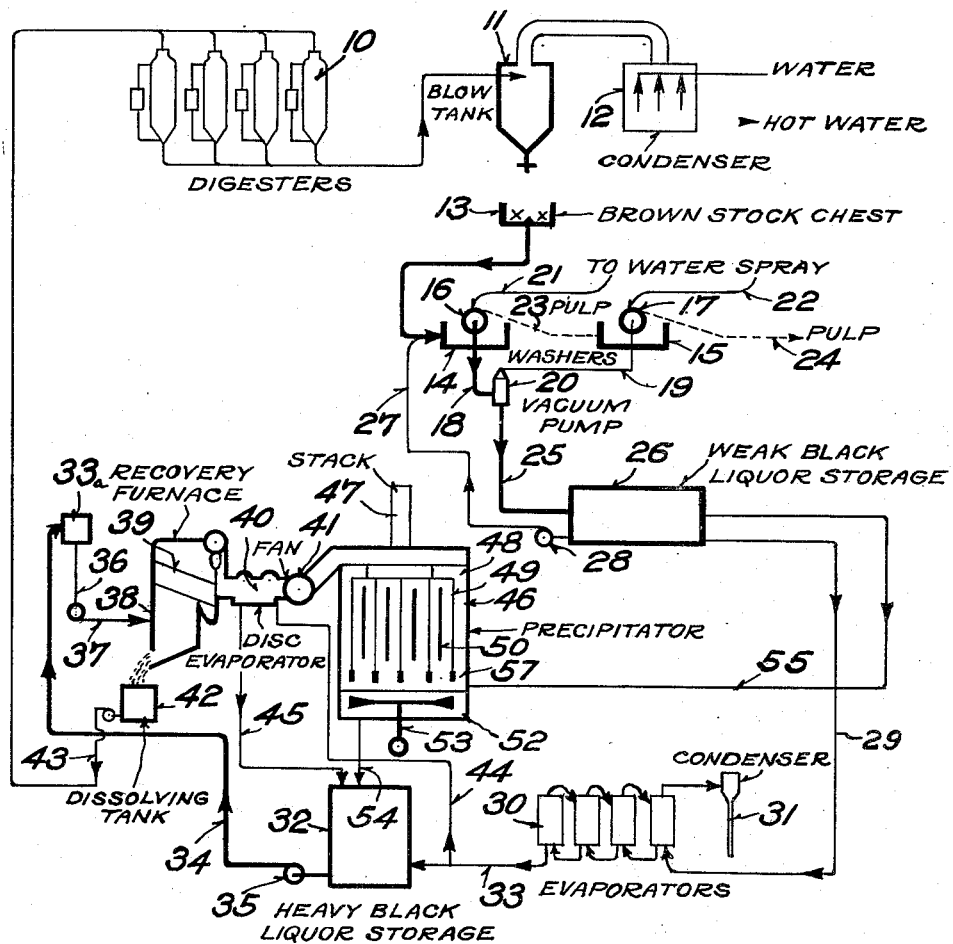
Fig. 1 is a diagrammatic view of a sulphate paper mill in accordance with the invention.

Referring to the drawings, particularly to Fig. 1 thereof, the paper pulp mill shown includes the conventional digesters 10, blow tank 11 and condenser 12. From the blow tank, the digested pulp passes to a brown stock chest 13, and thence to the pulp washers 14 and 15.

The pulp washers may be of the conventional rotary screen type including filter screens 16 and 17 connected through lines 18 and 19 to a vacuum pump 20. Water for washing the pulp on the filter screens is supplied through lines 21 and 22 from any suitable source (not shown). Pulp from the first stage washer 14 is transferred to the second stage washer 15 as indicated by the arrow 23 and the finally washed pulp is sent on to further processing as indicated by the arrow 24.

From the vacuum pump 20, the mixed weak black liquor filtrate and combined washings pass by way of the pipe 25 to the weak black liquor storage tank 26. A conduit 27 including a pump 28 is provided for recirculating weak black liquor from the tank 26 to the first stage washer 14 in order that the brown stock may be diluted if necessary to facilitate filtration.

Weak black liquor flows from the storage tank through the conduit 29 to the multiple-effect evaporator 30 wherein it is concentrated to a strength such that it will burn properly in the recovery furnace. The multiple-effect evaporator 30 is conventional in design and, as shown, consists of four effects in series and is provided with a barometric condenser 31.

The concentrated heavy black liquor issuing from the multiple-effect evaporator flows to a heavy black liquor storage tank 32 through a pipe line 33. From the tank 32 the heavy black liquor is passed to a charging tank 33a through the conduit 34 including a pump 35. The heavy black liquor flows by gravity from the charging tank 33a through the line 36 to the furnace charger 37 which feeds the black liquor to a conventional recovery furnace 38.

The recovery furnace shown by way of illustration is a spray type furnace wherein the black liquor is sprayed upon a bed of hot ash in the bottom of the furnace and burned. The organic matter in the liquor is sufficient to sustain combustion. The sulphur compounds contained in the liquor are burned and the sodium sulphate is reduced to sodium sulphide. The gases resulting from furnace combustion pass through heat recovery equipment including a water tube boiler 39 and a disc evaporator 40 and are exhausted by the fan 41.

Ash from the recovery furnace is discharged into a dissolving tank 42 wherein it is dissolved in water to form a solution of proper concentration for digesting wood chips or other cellulosic material. The sulfhydrate or sulfide solution is conducted through the pipe 43 and charged into the digestors 10 in customary fashion. Any make up sodium sulphate required may be charged to and reduced in the recovery furnace together with the heavy black liquor.

The disc evaporator 40 that is supplied with hot flue gases from the recovery furnace may be utilized to further concentrate a portion of the heavy black liquor issuing from the concentrating evaporator 30. Some of the liquor is bled from the pipe 33 and conducted by a pipe 44 to the disc evaporator. The black liquor concentrated in the disc evaporator is returned to the system through the pipe 45 discharging into the heavy black liquor storage tank 32.

Flue gases exhausted from the recovery furnace and disc evaporator by the fan 41 are laden with moisture and relatively large amounts of ash. The suspended ash consisting essentially of finely divided sodium sulphate with small amounts of impurities, if allowed to escape into the atmosphere would result in relatively large loss of important chemical material. It is desirable to recover this ash in the interests of economy and of abating an air pollution nuisance. Therefore the flue gases are passed through an electrical precipitator designated by the general reference numeral 46 before flowing out of the stack 47 to the atmosphere.

The precipitator 46, to be described in greater detail hereinafter, includes in the upper portion of the shell a precipitation zone 48 generally defined by complementary discharge electrodes 49 and extended surface electrodes 50 through which the flue gases pass and wherein suspended material borne by the gases is precipitated upon the extended surface electrodes 50 in the form of a dry powdery deposit. The precipitated ash is removed from the surfaces of the electrodes by rapping the electrodes or in any other conventional dry way. The ash removed from the electrodes falls into a sump 57 formed in the lower zone of the shell of the precipitator and into a pool 52 of weak black liquor maintained in the sump in an agitated condition by means of a mechanical agitator designated by the general reference numeral 53. The precipitated material is dissolved in the weak black liquor thereby fortifying it or increasing its concentration of dissolved solids. When the concentration of the fortified black liquor in the sump is about the same as the concentration of the heavy black liquor in the storage tank 32, some of the liquor is drawn off and conducted to the heavy black liquor storage tank 32 through the pipe line 54. Preferably simultaneously, the sump is replenished with weak black liquor drawn from the storage tank 26 through the conduit 55 and admitted to the sump to maintain the liquid level therein substantially constant. Thus, the sodium sulphate ash is recovered from the furnace flue gases and returned to the system.

Referring to Figs. 2 and 3, the electrical precipitator 46 has an outer shell 56 that may be formed of any suitable material of construction such as masonry or steel and may be lined with ceramic material to provide a corrosion resistant interior. The lower zone of the precipitator provides the sump 57 containing a relatively shallow pool of weak black liquor to be fortified.

The precipitating zone is positioned contiguous with and somewhat above the surface of the pool and is inclosed by the precipitator shell 56. Vertically extending plate or extended surface electrodes 50 are supported in parallel, horizontally spaced relation in the precipitation zone to provide a plurality of vertically extending gas conduits 51 therebetween. The usual fine wire or other discharge electrodes 52 are suspended between the plate electrodes 50 from an insulated framework 53 supported on insulators 54. The precipitator is energised in conventional manner as by grounding the collecting electrodes 50 and supplying high tension current to the insulated discharge wires 52 in any manner well known in the art.

The precipitator is conveniently divided as shown in two precipitating chambers A and B operating in parallel. A vertical baffle 63 extends from the top of the shell to a point 64 somewhat above the surface of the liquor in the sump. This baffle extends from the front wall to the back wall of the shell and provides an inlet passage 65 to which flue gases are introduced through the inlet pipe 66. The flue gases flow downwardly through the inlet passage 65, as shown by the arrows in Fig. 2, reverse direction around the bottom edge 64 of the baffle 63, flow upwardly through the precipitation chamber B and thence, as shown by the arrows, pass out of the top of the precipitator through the outlet pipe 67. A similar baffle 68 on the opposite side of the precipitator directs flue gases from the inlet pipe 69 downwardly through the inlet passage 70 and around the bottom edge of the baffle 68. These gases flow up through the precipitator chamber A and are exhausted through outlet 71 at the top of the shell.

A pair of similar vertical baffles 72 and 73 are disposed centrally of the shell to provide a central gas inlet passage 74 fed from inlet pipe 75. The flue gases pass downwardly through the central inlet passage 74 and, as shown by the arrows, divide and turn under the bottom edges of baffles 72 and 73 and pass upwardly through the precipitator chambers A and B to the respective outlet pipes 71 and 67.

Precipitated material is removed from the plates by vibrating the plates using conventional vibrators 76 and 77 mounted on the baffles 72 and 73 respectively and connected to the plates by vibration-transmitting rods 78 and 79, as seen in Fig. 2. Some of the particulate material also is deposited on the discharge electrode system. The usual vibrators 80 and 81, as shown in Fig. 3, transmit vibrations through the support rods 82 and 83 to vibrate the support frame 53 and the discharge electrodes 52. Vibration of the electrodes may be performed continuously or intermittently as may be indicated by the particular conditions of precipitator operation. Of course, other electrode cleansing devices may be employed instead of the vibrators shown by way of illustration.

Precipitated ash falls from the electrodes into the sump 57 and is dissolved in the pool of weak black liquid maintained therein. Referring to Figs. 4 and 5, showing the sump in horizontal and vertical section and illustrating in detail the liquor inlet and outlet means, the sump is provided with an agitator generally designated 84. The agitator has a vertical shaft 85 extending from below the bottom of the precipitator through an opening 86 formed in the bottom of the precipitator, the opening being lined with an upstanding pipe length 87 terminating above the normal level of liquid in the sump. The shaft 85 carries a cross arm 88 centrally mounted thereon above the normal liquid level and the arm is given added support by the stay-and-turn buckle devices 89 attached to the arm near the ends thereof and fastened to a bracket 90 mounted on top of the shaft 85. A plurality of agitator blades 91 depend from the arm 88 into the pool of liquor. As seen in Fig. 4 the blades are mounted at such an angle on the arm 88 that they tend to force the liquor outwardly and into the corners of the sump as the agitator is rotated in the direction of the arrows, thereby insuring thorough and efficient agitation.

Shaft 85 is carried in bearings 92 and 93 mounted in the framework 94 beneath the precipitator. The shaft is coupled to the output shaft 95 of a reducing gear 96 driven by a motor 97 through the belt 98.

Weak black liquor from the line 55 under control of valve 99 flows to a liquor inlet header 100 and thence by way of spaced inlet pipes 101 to the sump 57. The rate of admission of weak black liquor to the sump is controlled by valve 99 in accordance with the build up of concentration of liquor in the sump.

Fortified black liquor leaves the sump by way of outlet pipe 54, pump 102 and outlet control valve 103. Valve 103 is operated by a controller 104 that is responsive to the level of liquor in valve control tank 105. The valve control tank is in communication with the sump 57 through an open pipe 106 communicating with the pipe 54 and the level of liquor in the control tank assumes the same level as the liquor in the sump. A float 107 mounted on a pivoted arm 108 rises and falls with the liquor level and, through conventional control devices remotely controls the operation of valve 103 through the line 109. The valve 103 and controllers therefor are set to maintain a constant preselected level of liquor in the sump 57. It will thus be seen that the rate of admission of weak black liquor to the sump determines the rate of discharge of the fortified black liquor from the sump. The concentration of the fortified liquor leaving the sump is readily controlled by adjusting the valve 99 in accordance with the rate of dropping of precipitated material from the precipitator into the pool of liquid in the sump.

The invention is not limited to the sulfate process of making paper pulp but may find application in the soda process of pulp making or in other processes for the collection of liquid soluble dusts.

We claim:

1. The method of removing suspended particles of chemical compounds from chemical wood pulp recovery furnace gases, which comprises collecting said particles on charged electrodes, vibrating said electrodes to remove said particles, and permitting said particles to fall by gravity directly into a body of pulp digesting liquor.

2. The method of removing suspended particles of chemical compounds, including sodium sulfate, from the sulfate pulp recovery furnace gases, which comprises collecting said particles on charged electrodes, vibrating said electrodes to remove said particles, and permitting said particles to fall by gravity directly into a body of black liquor from the sulfate pulp digestion.

3. The method of removing suspended particles of chemical compounds from chemical wood pulp recovery furnace gases which comprises electrically precipitating the particles in the dry state on charged electrodes, causing the dry precipitated material to fall from said electrodes freely and directly into a body of pulp digesting liquor below the electrodes.

4. The method of removing suspended particles of chemical compounds from chemical wood pulp recovery furnace gases which comprises electrically precipitating the particles in the dry state on charged electrodes, causing the dry precipiated material to fall from said electrodes freely and directly into an agitated body of pulp digesting liquor below the electrodes.

5. An electrical precipitator for the recovery of suspended particles of chemical compounds from chemical wood pulp recovery furnace gases comprising a housing including a liquid-tight sump in the bottom of said housing, vertically extending dry collecting electrodes and complementary precipitating electrodes positioned in said housing above said sump to deliver precipitated material by gravity directly into said sump, gas inlet and gas outlet means in said housing for directing a stream of gas between said complementary electrodes, means for vibrating the electrodes to assist in removal of precipitated material therefrom, means for circulating a solvent liquor for the precipitate through said sump, and agitating means in said sump for stirring the liquor therein.

References Cited in the file of this patent

UNITED STATES PATENTS

| Number | Name | Date |
|---|---|---|
| 1,338,271 | Welch | Apr. 27, 1920 |
| 1,345,034 | Stringfield | June 29, 1920 |
| 1,689,534 | Richter | Oct. 30, 1928 |
| 1,795,557 | Hagglund | Mar. 10, 1931 |
| 1,879,503 | Rinman | Sept. 27, 1932 |
| 1,905,053 | Powell | Apr. 25, 1933 |
| 2,000,020 | Heinrich | May 7, 1935 |
| 2,238,456 | Tomlinson | Apr. 15, 1941 |
| 2,313,389 | Meston | Mar. 9, 1943 |
| 2,349,550 | Hedberg | May 23, 1944 |

FOREIGN PATENTS

| Number | Country | Date |
|---|---|---|
| 321,413 | Great Britain | Nov. 7, 1929 |